(12) United States Patent
Lawson

(10) Patent No.: US 7,042,555 B1
(45) Date of Patent: May 9, 2006

(54) PORTABLE PIPE TALLY SYSTEM

(76) Inventor: Phillip L. Lawson, 1901 Windrift St., Midland, TX (US) 79707

( * ) Notice: Subject to any disclaimer, the term of this patent is extended or adjusted under 35 U.S.C. 154(b) by 329 days.

(21) Appl. No.: 10/238,287

(22) Filed: Sep. 10, 2002

(51) Int. Cl.
*G01C 3/00* (2006.01)
*G01C 1/00* (2006.01)

(52) U.S. Cl. ............................... 356/3; 356/6; 356/138; 356/154; 73/152.01

(58) Field of Classification Search ............ 356/138, 356/154, 634, 3, 3.03, 3.11, 6, 15, 9, 18; 73/152.01; 702/155, 158
See application file for complete search history.

(56) References Cited

U.S. PATENT DOCUMENTS

| | | | |
|---|---|---|---|
| 4,234,942 A | 11/1980 | Prause et al. | |
| 4,468,959 A | 9/1984 | Roberts | |
| 4,671,654 A * | 6/1987 | Miyahara et al. | 356/139.06 |
| 4,701,869 A | 10/1987 | Callegari, Sr. et al. | |
| 5,202,680 A * | 4/1993 | Savage | 340/853.1 |
| 6,593,587 B1 * | 7/2003 | Pease | 250/559.19 |

* cited by examiner

*Primary Examiner*—Layla Lauchman
(74) *Attorney, Agent, or Firm*—Robert J. Harter

(57) ABSTRACT

A portable laser system includes a laser unit and a target unit for measuring the length of a series of pipe assemblies. Either the laser unit or the target unit engages a threaded coupling at one end of the pipe assembly and the other unit engages external pipe threads at an opposite end of the pipe assembly. The laser unit includes a resident memory (i.e., the memory moves with the laser unit), so that the laser system can read the length of more than one pipe assembly before downloading the readings to a computer. The computer then compiles the readings in groups of twenty and calculates an anticipated overall length if the pipe assemblies were interconnected as a string of pipes.

2 Claims, 7 Drawing Sheets

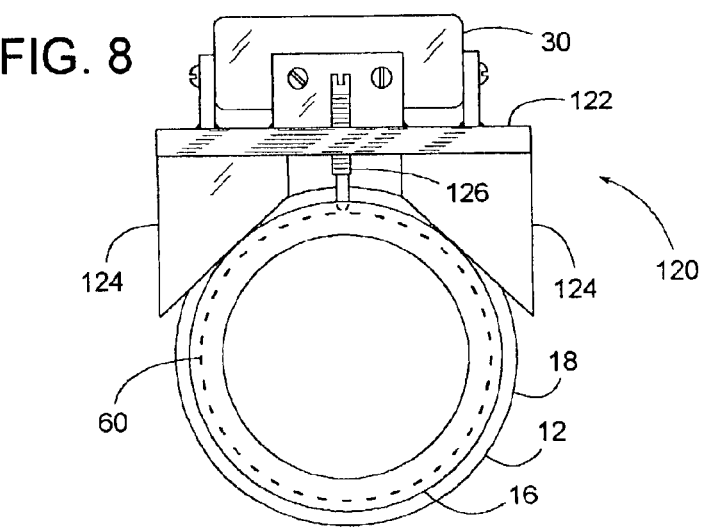
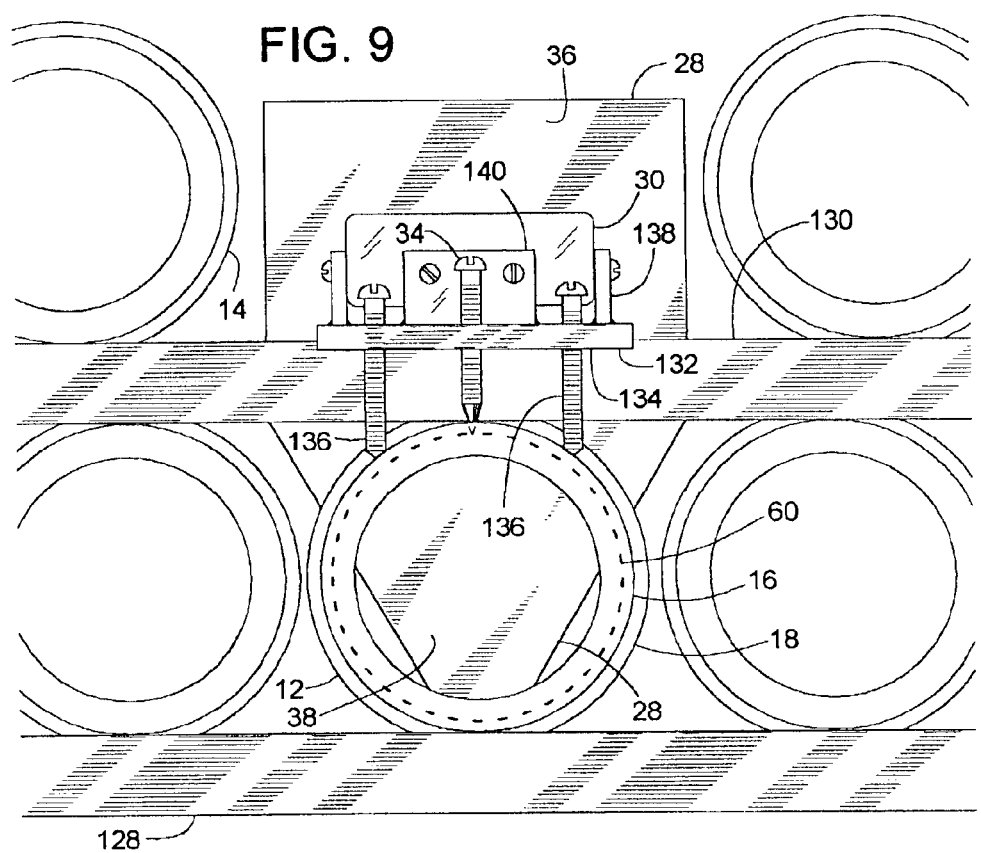

PORTABLE PIPE TALLY SYSTEM

BACKGROUND OF THE INVENTION

1. Field of the Invention

The subject invention generally pertains to the measurement of pipe used in wells and more specifically to a portable pipe measuring system.

2. Description of Related Art

Oil wells and wells for other fluids typically comprise a string of tubing surrounded by a well casing. The well casing is what lines the wellbore and usually comprises a long string of relatively large diameter pipe interconnected by threaded couplings known as collars. Casings generally define the overall diameter and depth of a wellbore. Well tubing has a much smaller diameter for fitting down inside the casing. Tubing typically comprises a long string of pipe sections whose threaded ends are also interconnected by threaded couplings. The tubing provides a conduit for conveying oil or some other fluid to the surface of the well. Usually a submerged reciprocating pump is attached to the lower end of the tubing to draw the fluid from the annulus between the inside diameter of the casing and the outside diameter of the tubing, and to force the fluid up through the tubing to the surface. To operate the pump, a string of sucker rods extends through the tubing to serve as a long reciprocating connecting rod that couples the submerged pump to a reciprocating drive unit at ground level.

Measuring the length of each casing or tubing segment before installing it down a wellbore can help establish a record of the pipe string's final overall length. This can be accomplished by simply using a tape measure to measure each joint (i.e., measure the length of a pipe segment plus one coupling attached to it) and then recording and summing the readings manually (i.e., manually tallying the readings). To minimize human error, more elaborate electronic measuring methods have been developed, such as those disclosed in U.S. Pat. Nos. 4,701,869; 4,468,959; and 4,234,942. Although electronic methods of measuring provide significant advantages over more traditional methods, such electronic methods have some serious limitations.

The system disclosed in U.S. Pat. No. 4,701,869 comprises a laser connected to a computer. Measurements of the laser go directly to the computer, which then directs a marker to impress the information on the pipe. Having a computer connected to the laser unit greatly limits the system's portability. For instance, when measuring a set of pipes on a rack, instead of moving the laser unit from one pipe to the next, individual pipe segments are rolled onto motor-driven rollers that are controlled by the computer. In some cases, as shown in the patent's FIG. 2, the laser portion of the measuring system is mounted to a more portable fixture (item 5). However, the overall portability of the total system is still limited by still being connected to the computer and is further limited to a target (item 6a) that is constrained to a drilling rig's elevators (item 6). The computer, rollers and/or the drilling rig's elevators can make the '869 system cumbersome and impractical for measuring pipes that are stored in a conventional pipe yard.

A conventional pipe yard is generally a wide-open, outdoor area with numerous pipe racks distributed over several acres. A pipe measuring system tied to a computer means that the computer may have to be lugged around over great distances. Providing electrical power may be a problem with a desktop computer, and the rechargeable battery of a laptop is often limited to just a few hours (due to powering a monitor, internal cooling fan, etc.). Also, bright sunlight can diminish the visibility of a computer screen and is known to damage the screen of many laptop computers. Moreover, rain and extreme outdoor temperatures can be an even greater problem for computers.

A further limitation of the '869 system is illustrated in the patent's FIG. 2. Apparently, both the upper and lower couplings need to be screwed onto the upper pipe in order for the laser measurement system to take a length reading from coupling edge to coupling edge (with compensation for an offset between one coupling edge and the bottom of the elevator). This can interfere with efficient assembling of a pipe string. For instance, a hoist would have to lower the elevators enough to allow the upper pipe to be screwed into the lower coupling, and it appears that the hoist may have to lift the elevators back up again to take up any slack out from between the elevators and the upper coupling.

The measuring system of U.S. Pat. No. 4,468,959 is also a system meant to operate at a generally fixed location, i.e., at a wellbore. Similar to the '869 device, the '959 device also includes a reflector that is attached to a rig's elevators. The system does not appear to be readily adapted for measuring pipes that are lying on a rack.

The measuring system of U.S. Pat. No. 4,234,942 senses the length of a pipe segment through the interior of the pipe. When using such a system, if the length readings of a series of individual pipes are summed to determine a total length of the pipes when interconnected, a significant error may occur by disregarding the length of the couplings or by disregarding the threaded overlap between the couplings and the pipe ends. Also, when relatively long pipes are lying horizontally on a rack, bowing of the pipe may obstruct a clear linear path between opposite ends of the pipe.

Consequently, a need exists for a simple, handheld pipe measuring device that is more reliable than a tape measure and is more portable than current electronic pipe measuring systems.

SUMMARY OF THE INVENTION

It is an object of the invention to provide a reliable, handheld device for measuring pipe.

Another object of some embodiments is to measure a pipe from the end of a threaded coupling that is at one end of the pipe to an external thread at the opposite end of the pipe.

Another object of some embodiments is measure the length of a pipe with a laser unit that includes an adjustable frame that can vary the distance that the laser beam is spaced apart from the pipe.

Another object of some embodiments is to provide a laser unit with an adjustable reference member to allow the reference member to engage the threads of various diameter pipes.

Another object of some embodiments is to provide a laser unit with a resident memory, so pipe length measurements of the laser unit do not have to be individually downloaded to a computer.

Another object of some embodiments is to provide a laser system with a laser unit and a target unit, wherein one unit engages a coupling at one end of a pipe assembly and the other unit engages pipe threads at an opposite end of the pipe assembly. The positions of the two units are interchangeable.

Another object of some embodiments is to provide a laser system with a laser unit and a target unit, wherein the target unit is a durable, inexpensive device that can be hand held against the upper end of a vertical pipe without significant loss if the target unit were accidentally dropped.

Another object of some embodiments is to use a computer to organize a set of pipe length readings in groups of twenty readings.

Another object of some embodiments is to provide a laser system for measuring a hoist-suspended pipe assembly that has exposed threads rather than a coupling at the lower end of the pipe assembly.

These and other objects of the invention are provided by a laser system that includes a laser unit and a target unit. To measure the length of a pipe assembly, one unit preferably engages a threaded coupling at one end of the pipe assembly and the other unit preferably engages pipe threads at an opposite end of the pipe assembly. The laser unit preferably includes a resident memory (i.e., the memory moves with the laser unit), so that laser system can read more than one pipe length before downloading the readings to a computer.

BRIEF DESCRIPTION OF THE DRAWINGS

FIG. 8 is an end view of another embodiment of laser unit placed against a pipe assembly.

FIG. 9 is an end view of another embodiment of a laser system measuring the length of a pipe assembly that is on a lower level of a two-tier rack of pipe assemblies.

DESCRIPTION OF THE PREFERRED EMBODIMENT

Figure 1:
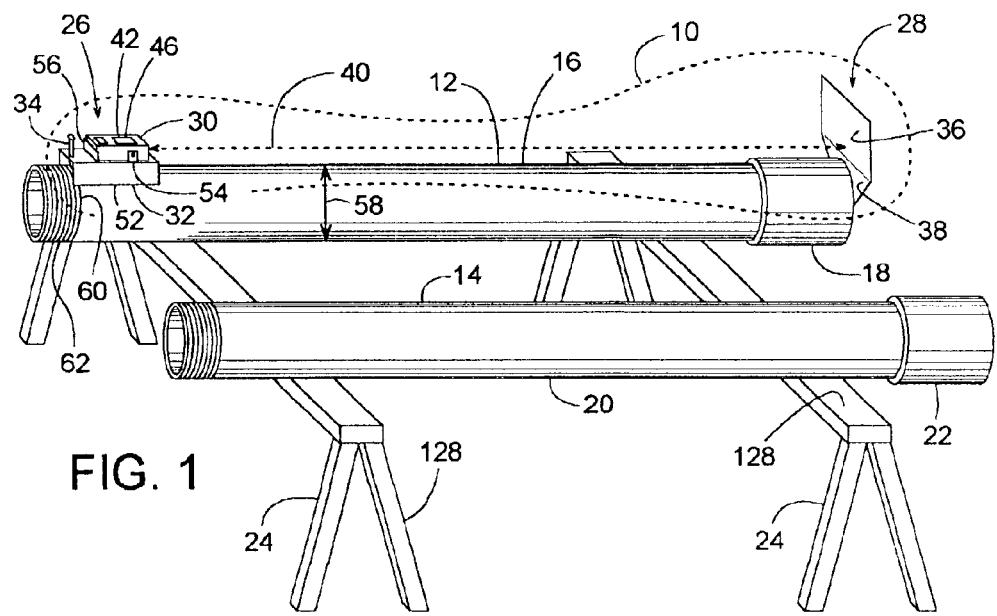
FIG. 1 is a perspective view of a pipe measuring setup for tallying the lengths of a plurality of pipe assemblies.
Figure 2:
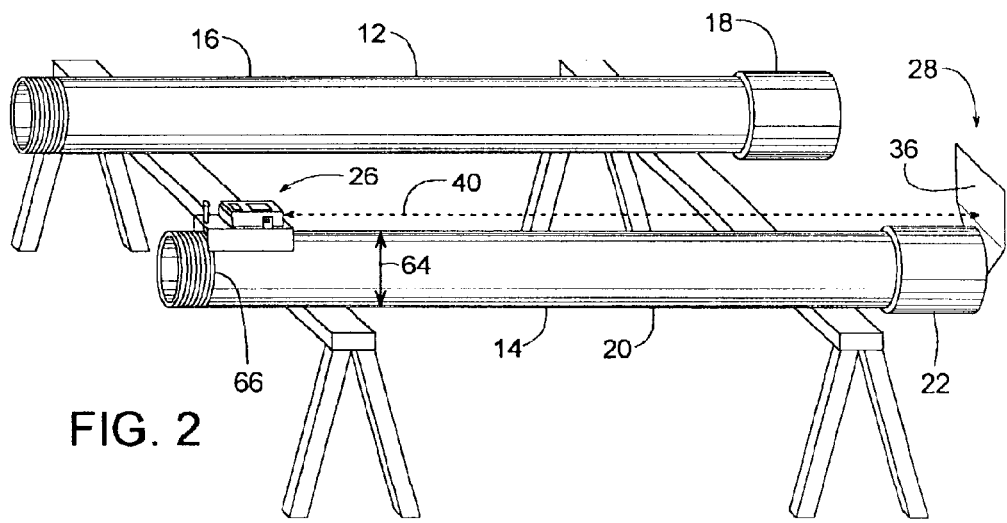
FIG. 2 is similar to FIG. 1, but showing a laser system having been moved from a first pipe assembly to a second pipe assembly.

FIGS. 1 and 2 show a laser system 10 in a pipe measuring setup for measuring and tallying the individual lengths of a group of pipe assemblies, wherein each pipe assembly comprises a pipe and a coupling. The lengths of each pipe assembly can then be tallied and summed to provide an anticipated overall length of a pipe string that could be created by interconnecting the group of pipe assemblies. Although the setup may include any quantity of pipe assemblies, only two are shown here for simplicity.

Pipe assemblies 12 and 14 represent any type of pipe assembly that may be associated with a wellbore. Examples of pipe assemblies 12 and 14 include, but are not limited to, well casings, tubing, and drill pipe. Pipe assembly 12 comprises a pipe 16 with external threads at both ends and a coupling 18 screwed onto one end of the pipe. Likewise, pipe assembly 14 also comprises a pipe 20 and a coupling 22. In this example, pipe assemblies 12 and 14 are stored on a pipe rack 24 that supports the pipe assemblies in a horizontal orientation; however, the invention can also be applied to vertical pipe assemblies.

Figure 3:
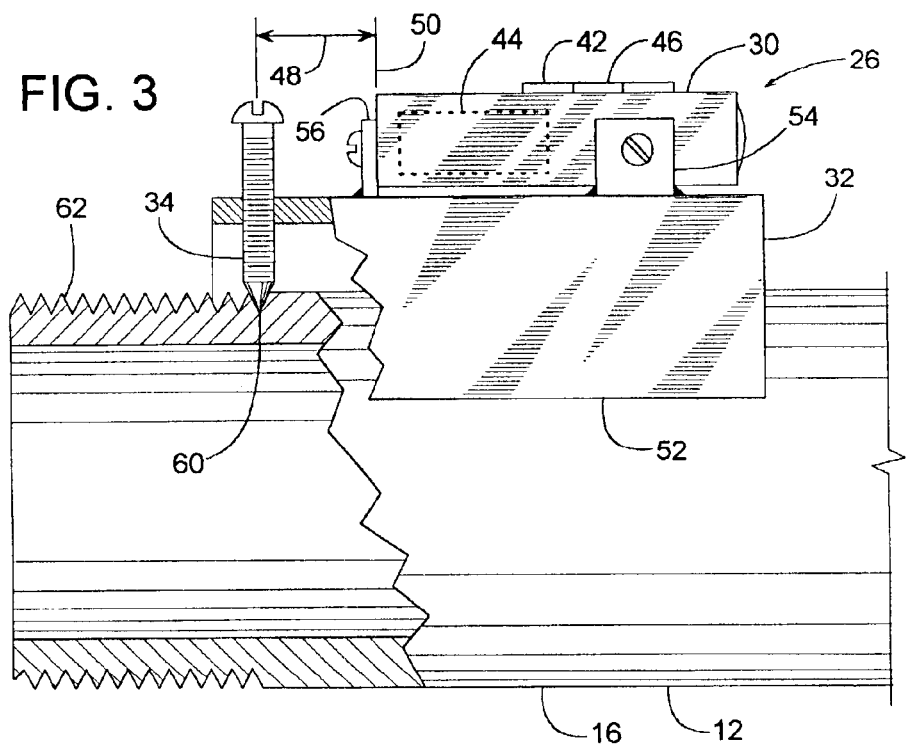
FIG. 3 is a cutaway view of a laser unit engaged with the threaded end of a pipe.

To measure the length of a pipe assembly, laser system 10 comprises a handheld laser unit 26 and a handheld target unit 28 that can be placed at opposite ends of the pipe assembly. Referring further to FIG. 3, laser unit 26 includes a laser device 30 supported by a handheld laser frame 32. When placed up against a pipe assembly, frame 32 helps aim laser device 30 in a direction generally parallel to the pipe. A laser reference member 34 extending from frame 32 helps position laser unit 26 at a particular axial location along the pipe assembly. In this example, target unit 28 includes a handheld target surface 36 and a target reference member 38. Target surface 36 is adapted to reflect back into laser device 30 a laser beam 40 emitted from laser device 30, whereby laser device 30 derives a length reading. Target reference member 38 can simply be an extension of target surface 36 and can be held up against the end of a coupling to establish the axial position of surface 36 relative to a pipe assembly. The term, "handheld" refers to any portable device that can be readily carried in one hand, and more specifically refers to a portable device that has a volume of less than half of a cubic foot and a mass of less than twenty-five pounds.

The structural details of laser unit 26 can vary widely, however, in currently preferred designs, laser device 26 is a "DISTO memo," "DISTO pro" or a "DISTO pro a," which are laser measurement devices of Leica Geosystems AG, of Heerbrugg, Switzerland. Laser device 30 includes various features such as a trigger 42 for taking a length a measurement, a resident memory 44 (FIG. 3) for storing a plurality of length measurements, and an input 46 for compensating for axial offsets of fixturing. Such axial offsets may include an axial distance 48 between laser reference member 34 and a zero-reference 50 of laser device 30, and in some cases an axial offset distance between target surface 36 and target reference member 38. For target unit 28, no appreciable offset exists between target surface 36 and target reference member 38, as the two are generally coplanar. The term, "resident memory" refers to a digital storage device to which digital data can be stored and later recalled, and wherein the resident memory is part of the laser device (i.e., the memory is carried by and moves with laser device). Thus, laser frame 32 carries and supports both laser device 30 and memory 44. Laser frame 32 may comprise a piece of channel 52 with mounting tabs 54 and 56 for holding laser device 30. Channel 52 can be made of any material including, but not limited to, iron, steel, aluminum, plastic, etc. Channel 52 serves as a saddle that can fit up against various diameter pipe or couplings to help aim laser device 30 in a direction generally parallel to the pipe. To enable reference member 34 to generally reach a thread's root diameter of various diameter pipe, reference member 34 can be made adjustable by screwing reference member 34 through a threaded hole in channel 52.

To measure pipe assembly 12, laser unit 26 can be placed up against an outer diameter 58 (first outer diameter) of pipe 16 with laser reference member 34 preferably aligned with a last complete thread 60 of exposed threads 62, as shown in FIGS. 1 and 3, and target unit 28 can be manually held up against the end of coupling 18 to face laser unit 26, as shown in FIG. 1. The term, "exposed threads" refers to threads that are at least partially visible or accessible. With laser unit 26 aimed in a first direction toward target surface 36, pressing input 42 (or otherwise actuating input 42) triggers laser device 30 to take a first length reading, which laser device 30 stores in a register of memory 44. By taking offset distance 48 into account, laser device 30 stores the distance between laser reference member 34 and target surface 36 or the distance between thread 60 and the end of coupling 18. The measurements are preferably in units of feet rounded off to the nearest 1/100 of an inch.

To measure subsequent pipe assemblies, such as pipe assembly 14, laser system 10 is carried from pipe assembly 12 to pipe assembly 14 with laser unit 26 placed against an outer diameter 64 (second outer diameter) of pipe 20, as shown in FIG. 2. Laser reference member 34 can now be aligned with a last complete thread 66 of pipe assembly 14, and target unit 28 can be manually held up against the end of coupling 22. With laser unit 26 aimed in a second direction toward target surface 36, pressing input 42 triggers laser device 30 to take a second length reading, which laser device 30 stores in another register of memory 44. Laser device 30 now also stores the second distance from laser reference member 34 to target surface 36 or the distance between thread 66 and the end of coupling 22.

Figure 4:
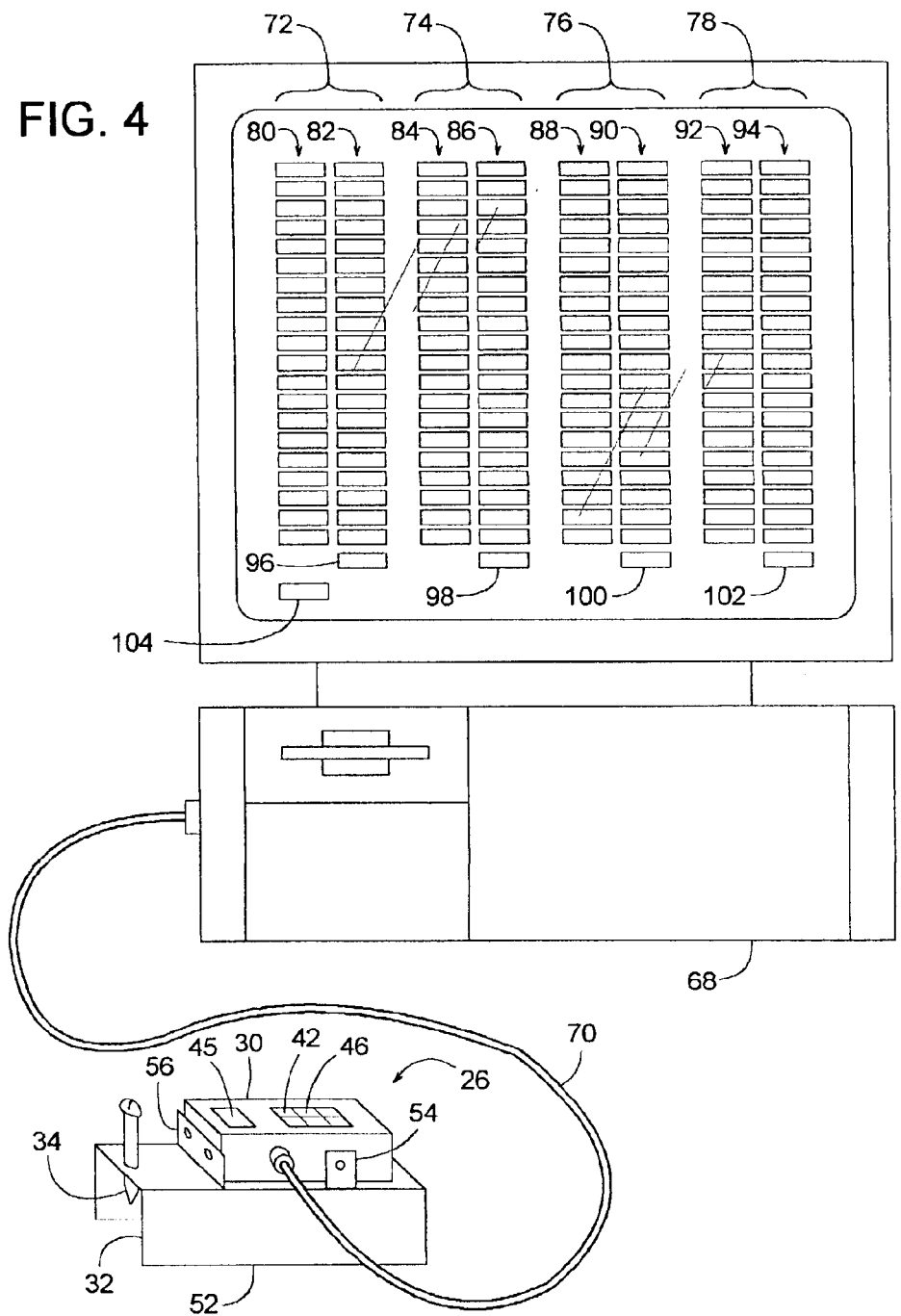
FIG. 4 is a schematic view showing a plurality of length readings being downloaded from a laser device to a computer, wherein the computer tallies the readings in an Excel spreadsheet.

The method of measuring pipe assemblies 12 and 14 can be continued on additional pipe assemblies to collect length readings on, for example, twenty pipe assemblies. After taking and storing all twenty length readings, the plurality of length readings can later be downloaded to a conventional desktop or laptop computer 68, as shown in FIG. 4. The actual number of pipe assemblies or length readings could be in the hundreds, depending on the length of the pipe string. Laser device 30 can be connected to computer 68 using an appropriate data cable 70, such as a DISTO GEV1021 (725078), a DISTO data cable (708175), or a conventional commercially available zero-modem cable. Downloading the data from laser device 30 to computer 68 can be facilitated by use of software that Leica Geosystems provides with their DISTO laser devices. The software allows the data to be imported into a Microsoft Excel spreadsheet.

Once in an Excel spreadsheet, the data can be organized and manipulated in various ways. Referring to FIG. 4, for example, the spreadsheet, which is shown displayed on a computer monitor screen, organizes eighty length readings (for eighty individual pipe assemblies) in four groups 72, 74, 76 and 78, each of which has twenty length readings. Each length reading has a corresponding joint number that identifies a particular pipe assembly, such as pipe assembly 12. The joint numbers are typically assigned (usually sequentially) and manually written on the pipe assemblies with each pipe assembly having its own individual number. The joint numbers, in conjunction with their corresponding length readings, help identify which pipe assemblies should be included or omitted from the final pipe string to achieve a total string length that is appropriate for a particular wellbore.

For example, column 80 has a list of joint numbers in ascending order from one to twenty and column 82 has a list of length readings that correspond to the joint numbers in column 80. Column 84 has a list of joint numbers from twenty-one to forty and column 86 has a list of length readings that correspond to the joint numbers in column 84. Column 88 has a list of joint numbers from forty-one to sixty and column 90 has a list of length readings that correspond to the joint numbers in column 88. Column 92 has a list of joint numbers from sixty-one to eighty and column 94 has a list of length readings that correspond to the joint numbers in column 92. Values 96, 98, 100 and 102 are each a sum of the lengths in columns 82, 86, 90 and 94 respectively, and value 104 is the sum of values 96, 98, 100 and 102, whereby if joints one through eighty were assembled into one long pipe string, value 104 would be the total length of the pipe string.

In some embodiments, memory 44 of laser device 30 stores not only the plurality of length readings but also their corresponding joint numbers. So, both the joint numbers (e.g., column 80) and the length readings (e.g., 82) are downloaded from laser device 30 to computer 68. Also, laser device 30 preferably includes a display 45 (FIG. 4) that sequentially displays each joint number for each particular length reading. This helps avoid mistakenly assigning a length reading to the wrong joint number. In operation, laser device 30 automatically and sequentially displays the joint numbers in ascending or descending order as the length readings are taken. However, if a length reading needs to be taken out of order, laser device 30 allows the user to jump to or return to a particular joint number.

Figure 5:
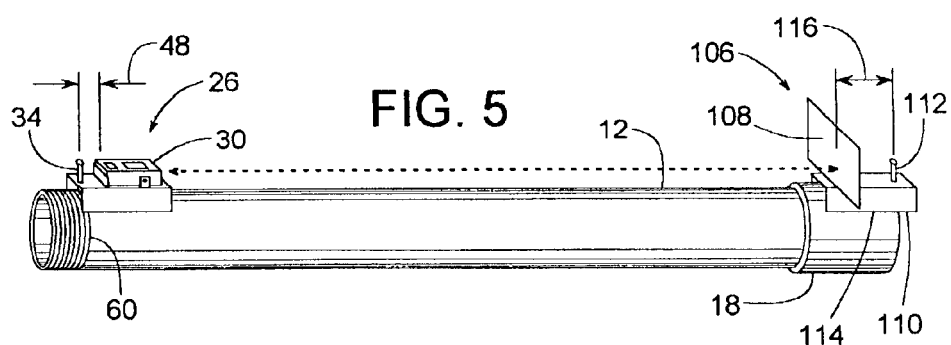
FIG. 5 is a perspective view of a laser system with a laser unit and a target unit disposed at opposite ends of a pipe assembly.

In another embodiment, shown in FIG. 5, a target unit 106 comprises a target surface 108 attached to a target frame 10 that is similar to laser frame 32. Axial positioning of target surface 108 along pipe assembly 12 is achieved by a target reference member 112 that screws into a channel 114 of target frame 110. Target reference member 112 engages the edge of coupling 18 in a manner similar to the way laser reference member 34 engages thread 60. With this setup, an axial offset distance 116 plus offset distance 48 should be inputted into laser device 30 so device 30 can still determine the actual distance between thread 60 and the edge of coupling 18.

Figure 6:
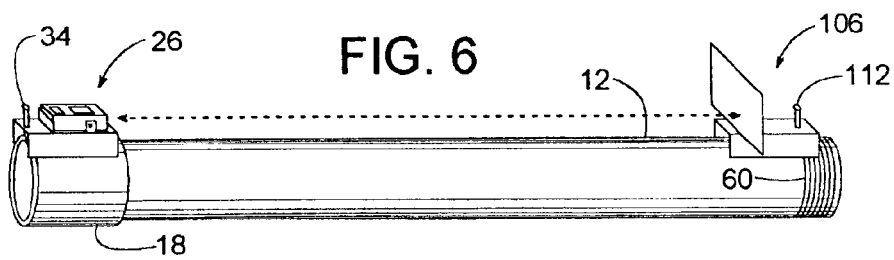
FIG. 6 is similar to FIG. 5, but showing the laser unit and target unit having switched positions with each other.

Target frame 110 enables laser unit 26 and target unit 106 to be placed at either end of pipe assembly 12. In FIG. 6, for example, laser unit 26 is placed so that laser reference member 34 engages the edge of coupling 18, and target unit 106 is placed so that target reference member 112 engages thread 60.

Figure 7:
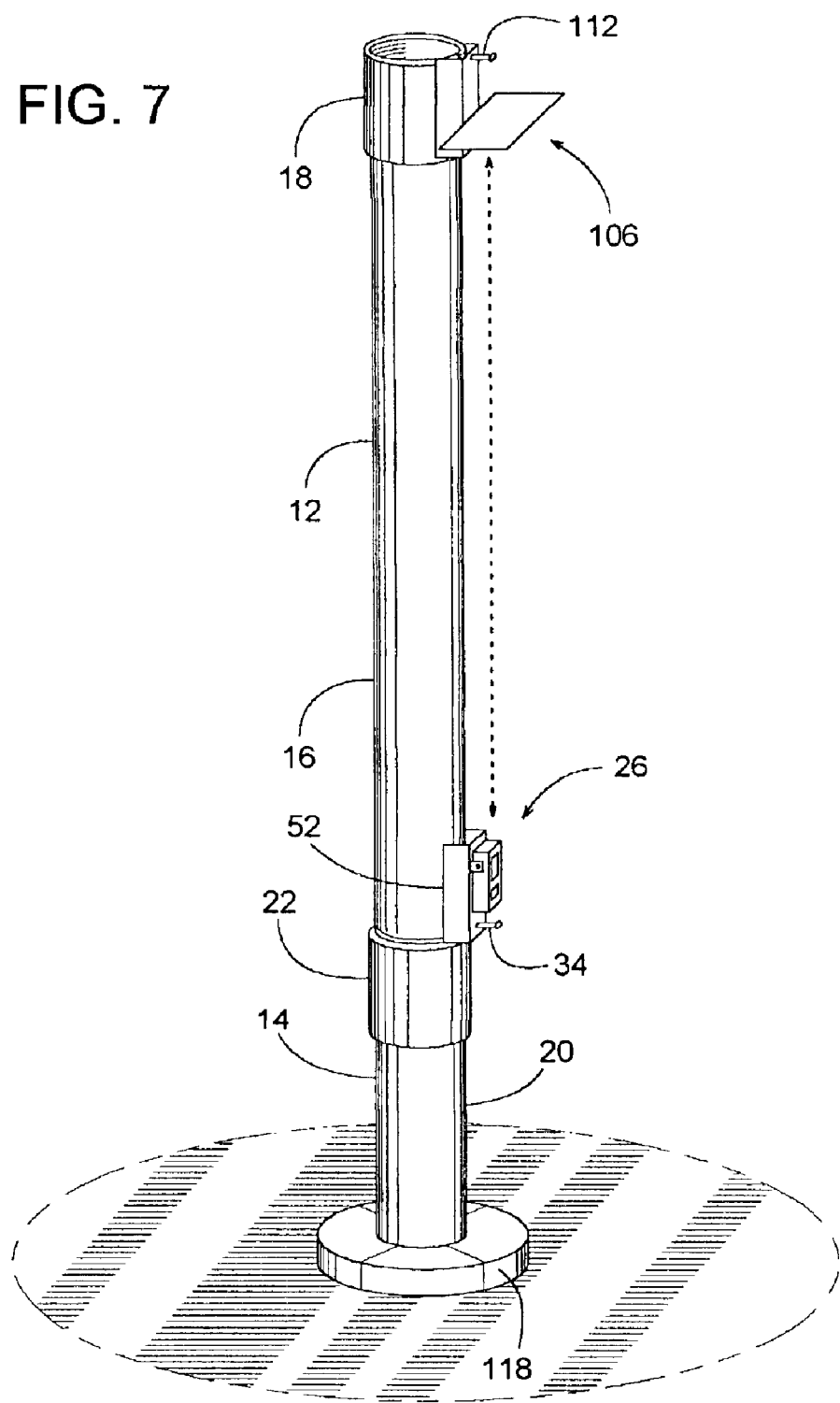
FIG. 7 is a perspective view of a laser system taking a length reading of a vertical pipe assembly that is at the top of a pipe string suspended within a wellbore.

In FIG. 7, laser unit 26 and target unit 106 are shown measuring pipe assembly 12 in a vertical orientation. Here, a pipe-clamping device 118, known as slips, holds lower pipe assembly 14 within a wellbore. By gripping pipe assembly 14, the slips can temporarily hold a string of pipe to allow a hoist to add additional pipe assemblies to the string. Upper pipe assembly 12 is shown with the lower end of pipe 16 screwed into coupling 22 of lower pipe assembly 14. Target reference member 112 engages the upper end of coupling 18, and laser reference member 34 engages thread 60 and/or the upper edge of coupling 22 to measure the length of upper pipe assembly 12. It should be apparent that portions of channel 52 may need to be cutaway or otherwise removed to allow proper engagement of laser reference member 34 without interference between channel 52 and coupling 22.

In another embodiment, instead of using a piece of channel iron for the frame of a laser unit or a target unit, a laser unit 120 has a frame 122 that includes a V-saddle 124 to engage pipe assembly 12, as shown in FIG. 8.

Laser unit 120 also includes a laser reference member 126 that is spring-loaded or resiliently moveable for automatically adjusting itself to pipes and couplings of various diameters. Such a reference member can also be used for a target unit. A resilient reference member can be a conventional spring plunger, as available through Reid Tool Supply Company, of Muskegon, Mich. or otherwise widely available. Another example of a resilient reference member is a strip of spring steel bent into an L-shape with a first leg of the L-shape adapted to extend into the threads of a pipe or over the edge of a coupling. The second leg of the L-shape can attach to the underside of the laser/target frame and run generally parallel to the pipe assembly. The second leg can be mounted with freedom to flex, which can vary how far the first leg extends.

In some cases, pipe racks store pipe assemblies in a stacked arrangement of two or more layers. In FIG. 9, for example, a lower row of pipe assemblies (including pipe assembly 12) is supported by a lower rack beam 128 (see also FIG. 1). And an upper row of pipe assemblies (including pipe assembly 14) is supported by an upper rack beam 130. Upper rack beam 130 may simply be a standard two-by-four piece of lumber running perpendicular to the pipe assemblies and serving as a spacer between the upper and lower row of pipe assemblies, or rack beam 130 may be identical to lower rack beam 128 without the rack's angled support legs. Measuring the lengths of the pipe assemblies in the upper row can be done using the laser systems already described. However, measuring the pipe assemblies in the lower row may require a laser frame 132 that can elevate laser device 30 so that laser beam 40 can clear the top of upper rack beam 130. Instead of channel 52 or V-saddle 124, laser frame 132 includes a base plate 134 with four adjustably extendable legs 136 (e.g., legs 136 screw through plate 134). Tabs 138 and 140 attach laser device 30 to base plate 134.

Figure 10:
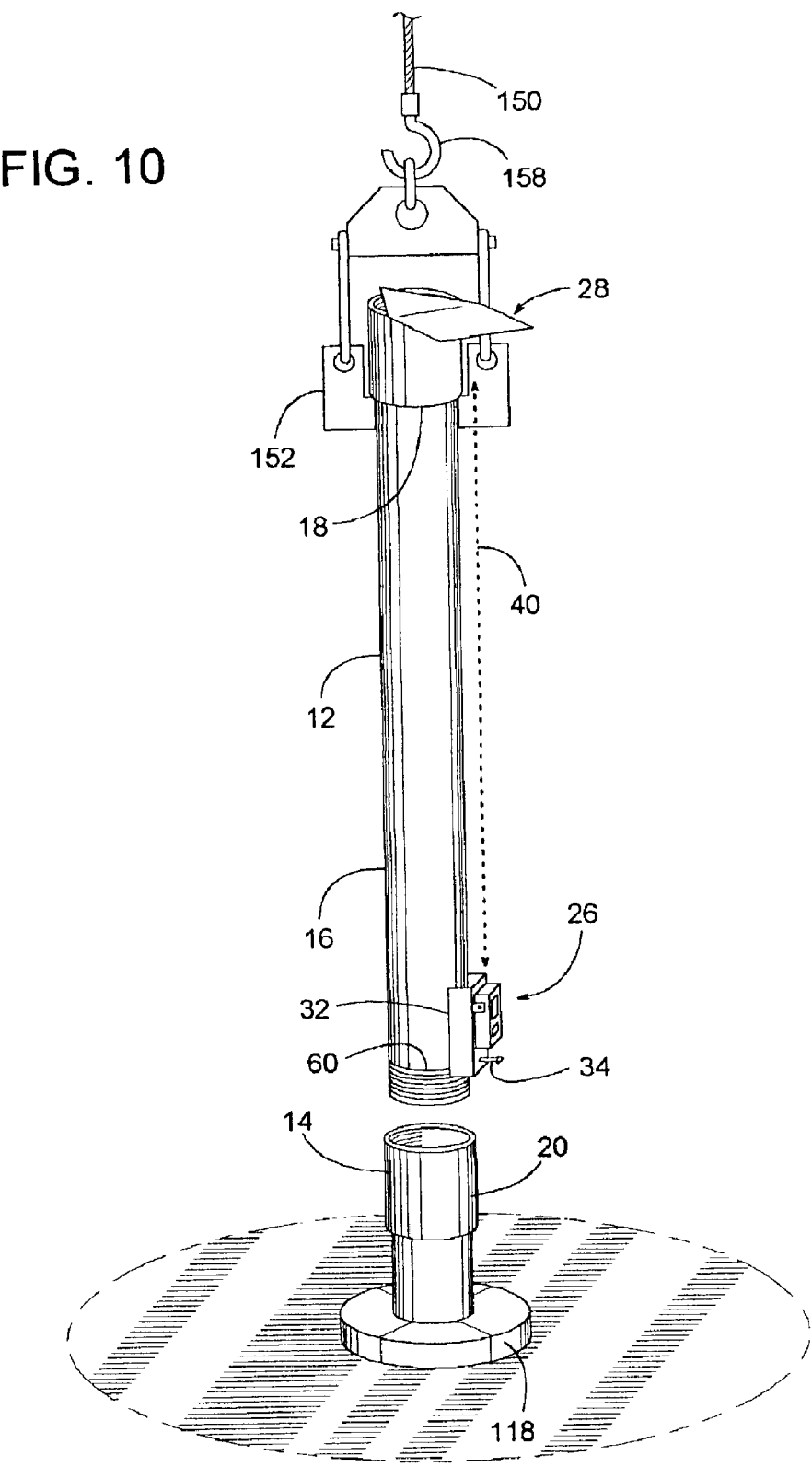
FIG. 10 is similar to FIG. 7, but showing a laser system measuring a pipe assembly suspended from a hoist.

In FIG. 10, pipe assembly 12 is shown suspended from a hoist cable 150 by way of a hoist block with elevators 152 that can releasably engage coupling 18. In this example, target unit 28 is placed atop of coupling 18, and reference member 34 of laser unit 26 engages thread 60. Coupling 18 preferably protrudes above an upper surface 154 of elevators 152 to permit the use of target unit 28. If elevators 152 obstruct laser beam 40, laser frame 32 can be replaced by an adjustable-height laser frame, such as laser frame 132 of FIG. 9.

Figure 11:
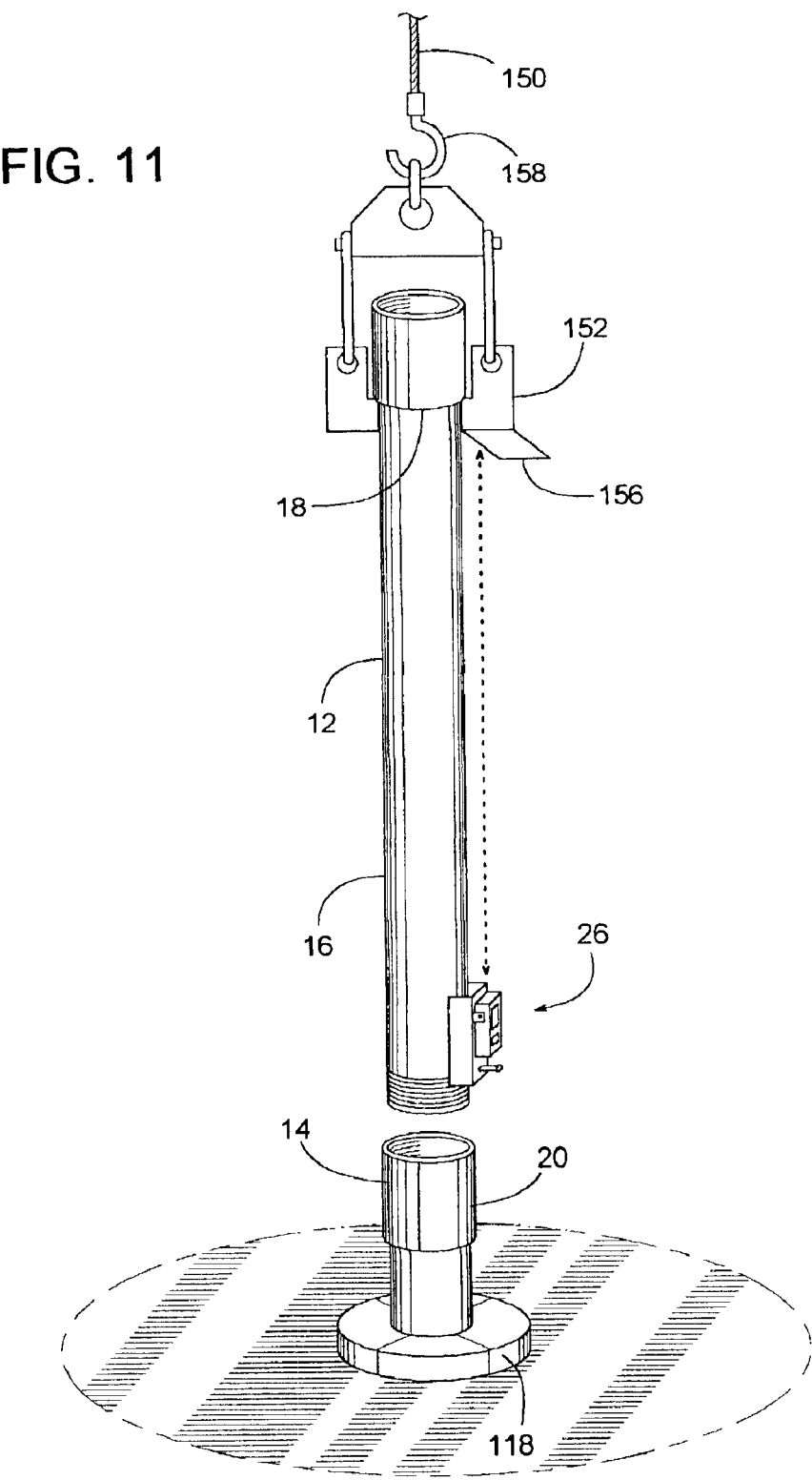
FIG. 11 is similar to FIG. 10, but with a target unit extending from schematically-illustrated elevators that engage an upper coupling of the pipe assembly.

In another embodiment, shown in FIG. 11, a target unit 156 is coupled to hoist cable 150 by attaching target unit 156 directly to elevators 152. Laser unit 4 can then be provided with a fixture-offset value that compensates for any vertical spacing (if any exists) between target unit 156 and the upper face of coupling 18. The offset value can be inputted into laser device 30 in a manner similar to inputting the values of offset 48 and 116. Attaching target unit 156 to elevators 152 eliminates the need for repeatedly placing a target unit directly against an upper coupling of a pipe assembly.

It should be appreciated by those skilled in the art that hoist cable 150 and hoist hook 158 are schematically illustrated to represent any hoist block that is suspended from a hoist cable and that the actual hoist cable may be looped in several passes through a conventional multi-sheave hoist block. Elevators 152 are also schematically illustrated to represent any device for supportively engaging a pipe assembly. It should also be appreciated that when measuring in a vertical orientation, as shown in FIGS. 7, 10, and 11, the tallying of pipe assemblies can be done during assembly or disassembly of a string of pipe.

Although the invention is described with reference to a preferred embodiment, it should be appreciated by those skilled in the art that various modifications are well within in the scope of the invention. Therefore, the scope of the invention is to be determined by reference to the claims that follow.

I claim:

1. A pipe measuring setup for a first pipe assembly and a second pipe assembly; wherein the first pipe assembly includes a first outer diameter, first exposed threads at a first end, and a first threaded coupling at a first coupling end; and the second pipe assembly includes a second outer diameter, a second exposed threads at a second end, and a second threaded coupling at a second coupling end, the pipe measuring setup comprising:

a laser reference member and a target reference member selectively placed at opposite ends of the first pipe assembly and opposite ends of the second pipe assembly, wherein at least one of the laser reference member and the target reference member selectively engages the first exposed threads and the second exposed threads, and at least one of the laser reference member and the target reference member selectively engages the first threaded coupling end and the second threaded coupling;

a handheld laser frame coupled to the laser reference member and adapted to selectively engage the first pipe assembly and the second pipe assembly, wherein the position of the laser reference member relative to the handheld laser frame is adjustable to vary the extent to which the laser reference member protrudes from the handheld laser frame;

a laser device supported by the handheld laser frame and selectively providing a laser beam, wherein the handheld laser frame upon being placed up against the first pipe assembly helps aim the laser device in a first direction that is substantially parallel to the first pipe assembly, and upon being placed up against the second pipe assembly helps aim the laser device in a second direction that is substantially parallel to the second pipe assembly;

a handheld target surface coupled to the target reference member and selectively moveable to the first pipe assembly and the second pipe assembly to face the laser device, thereby enabling the laser device to collect a first length reading of the first pipe assembly and a second length reading of the second pipe assembly; and a memory incorporated in the laser device and thereby supported by the handheld laser frame, wherein the memory stores the first length reading and the second length reading.

2. A pipe measuring setup for a first pipe assembly and a second pipe assembly; wherein the first pipe assembly includes a first outer diameter, first exposed threads at a first end, and a first threaded coupling at a first coupling end; and the second pipe assembly includes a second outer diameter, a second exposed threads at a second end, and a second threaded coupling at a second coupling end, the pipe measuring setup comprising:

a laser reference member and a target reference member selectively placed at opposite ends of the first pipe assembly and opposite ends of the second pipe assembly, wherein at least one of the laser reference member and the target reference member selectively engages the first exposed threads and the second exposed threads, and at least one of the laser reference member and the target reference member selectively engages the first threaded coupling end and the second threaded coupling;

a handheld laser frame coupled to the laser reference member and adapted to selectively engage the first pipe assembly and the second pipe assembly, wherein the laser reference member is resiliently moveable relative to the handheld laser frame;

a laser device supported by the handheld laser frame and selectively providing a laser beam, wherein the handheld laser frame upon being placed up against the first pipe assembly helps aim the laser device in a first direction that is substantially parallel to the first pipe assembly, and upon being placed up against the second pipe assembly helps aim the laser device in a a second direction that is substantially parallel to the second pipe assembly;

a handheld target surface coupled to the target reference member and selectively moveable to the first pipe assembly and the second pipe assembly to face the laser device, thereby enabling the laser device to collect a first length reading of the first pipe assembly and a second length reading of the second pipe assembly; and a memory incorporated in the laser device and thereby supported by the handheld laser frame, wherein the memory stores the first length reading and the second length reading.

* * * * *